United States Patent Office 3,781,426
Patented Dec. 25, 1973

3,781,426
PHOSPHORIC ACID ESTERS AND PESTICIDAL
PREPARATIONS CONTAINING THEM
Ernst Beriger, Allschwil, and Ladislaus Pinter, Basel, Switzerland, assignors to Ciba-Geigy AG, Basel, Switzerland
No Drawing. Original application July 24 1967, Ser. No. 655,289, now Patent No. 3,594,454. Divided and this application Mar. 9, 1971, Ser. No. 122,501
Claims priority application Switzerland, July 25, 1966, 10,735/66
Int. Cl. A01n 9/36
U.S. Cl. 424—212
10 Claims

ABSTRACT OF THE DISCLOSURE

This invention relates to a compound of the formula

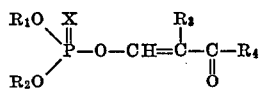

in which $R_1$ and $R_2$ are identical or different lower alkyl groups, X is an oxygen or a sulphur atom, $R_3$ represents a hydrogen atom, an alkyl group or a halogen atom and $R_4$ represents a lower alkoxy group, an alkyl group or an unsubstituted or substituted aryl group. The compounds are useful for combating insects and acarids.

CROSS-REFERENCE TO RELATED APPLICATIONS

This is a division of application Ser. No. 655,289, filed July 24, 1967, now U.S. Pat. No. 3,594,454.

The present invention relates to phosphoric acid esters and pesticidal preparations, especially preparations for combating harmful insects and similar pests, containing the phosphoric acid esters as active ingredient.

The present invention provides phosphoric acid ester of the general formula

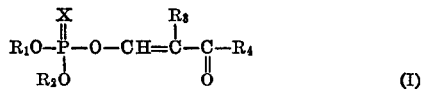

(I)

in which $R_1$ and $R_2$ are identical or different lower alkyl groups, X represents an oxygen or sulphur atom, $R_5$ is a hydrogen atom, a lower alkyl group or a halogen atom and $R_4$ stands for a lower alkoxy or alkyl group or an unsubstituted or substituted aryl group.

The present invention also provides pesticidal preparations, preferably preparations for combating harmful insects, which comprises as active ingredient a compound of the general formula given above, together with a suitable carrier.

As mentioned above, $R_4$ may be a lower alkoxy group, for example, methoxy, ethoxy, propoxy, isopropoxy or butoxy, or a lower alkyl group, for example, methyl, ethyl, propyl, butyl or an unsubstituted or substituted aryl group. The aryl group—which is preferably phenyl—may contain, as substituents, halogen atoms, nitro groups, cyano groups, thiocyano groups, trifluoromethyl groups and/or alkyl or alkoxy groups. Especially favorable properties are found in those compounds of the General Formula I in which $R_1$, $R_2$ and $R_3$ have the above meanings and $R_4$ represents a lower alkyl or alkoxy group, preferably the methyl or methoxy group. In this connection, compounds that are especially valuable are those in which $R_3$ represents methyl and X represents oxygen. The new phosphoric acid esters of the Formula I kill a variety of insects, for example, Orthoptera (crickets, locusts, cockroaches), Coleoptera (corn weavil, bacon beetle, meal beetle), Diptera (flies, midges), Homoptera (aphids), Aphaniphtera (fleas), Hymnoptera (ants), Lepidoptera (Prodenia, Limantria), and various other types of insects. Moreover, they display an acaricidal activity. Similarly constructed phosphoric acid esters are already known; thus for example, O,O-dimethyl-O(1-carbomethoxy-1-propen-2-yl) phosphate is on the market under the trade name Phosdrin.

However, the new phosphoric acid esters differ from the phosphoric acid ester of the formula

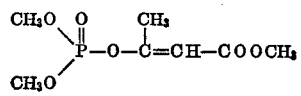

(II)

(Phosdrin) in a variety of ways, as will be shown hereinafter.

The new phosphoric acid esters of the General Formula I can be manufactured simply by reacting an alkali metal salt of an oxymethylene compound of the formula

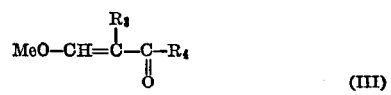

(III)

in which $R_3$ and $R_4$ have the above meanings and Me stands for an alkali metal atom, for example, sodium or potassium—with a phosphoric or triophosphoric acid ester halide of the formula

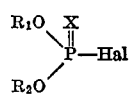

wherein $R_1$, $R_2$ and X have the above meanings and Hal represents a halogen atom.

The reaction may be carried out in a solvent, for example, in benzene, xylene or dioxane. Many of the esters manufactured in this manner can be purified by distillation under a high vacuum.

Phosphoric acid esters of the formula

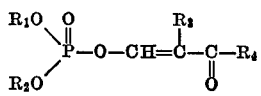

in which $R_1$ to $R_4$ have the above meanings—are also accessible by reacting a phosphite of the formula

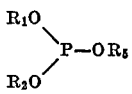

in which $R_1$ and $R_2$ have the above meanings and $R_5$ represents a lower alkyl radical—with an α-halogenated α-formylcarbonyl compound of the formula

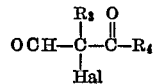

in which Hal stands for halogen, preferably chlorine or bromine, and $R_3$ and $R_4$ have the above meanings.

The forms in which the new preparations are applied vary according to the purpose for which they are to be used.

In order to manufacture spray solutions of the phosphoric acid esters of the General Formula I there may be used, for example, petroleum fractions having a high to medium boiling range, for example, diesel oil or kerosene, coal tar oil and oils of vegetable or animal origin and also hydrocarbons, for example, alkylated naphthalenes, tetrahydronaphthalene, if desired with the use of xylene mixtures, cyclohexanols or ketones, or chlorinated hydrocarbons, for example, trichlorethane or tetrachlorethane trichloroethylene or tri- or tetrachlorobenzenes. It is advantageous to use organic solvents that boil above 100° C.

It is especially advantageous to prepare aqueous forms of the preparation from emulsion concentrates, pastes or wettable spray powders by the addition of water. Suitable emulsifiers or dispersants are nonionic products, for example condensation products of aliphatic alcohols, amines or carboxylic acids containing a long-chain hydrocarbon residue having about 10 to 20 carbon atoms with ethylene oxide, for example, the condensation product of octadecyl alcohol with 25 to 30 mols of ethylene oxide, or of soybean fatty acid with 30 mols of ethylene oxide, or of commercial oleylamine with 15 mols of ethylene oxide or of dodecylmercaptan with 12 mols of ethylene oxide. Amongst the suitable anionic emulsifiers there may be mentioned especially: the sodium salt of the dodecylalcohol sulphuric acid ester or of dodecylbenzenesulphonic acid, the potassium or triethanolamine salt of oleic acid or of abietic acid or of mixtures of these two acids, or the sodium salt of a petroleumsulphonic acid. Suitable cationic dispersants are quaternary ammonium compounds, for example, cetyl pyridinium bromide or dihydroxyethylbenzyl dodecyl ammonium chloride.

The following examples illustrate the invention, the parts being parts by weight, except when otherwise stated.

EXAMPLE 1

(A) 145 parts of the sodium salt of oxymethylenepropionic acid ethyl ester are suspended in 600 parts by volume of absolute benzene and, while stirring and cooling with ice, 165 g. of diethylchlorophosphate are added drop by drop during 30 minutes. The batch is allowed to react further overnight at room temperature, is then washed with 200 parts by volume of water and 2×50 parts by volume of saturated sodium bicarbonate solution, the benzolic solution is dried over sodium sulphate and the benzene is evaporated under vacuum. The residue (151 parts) is distilled under a high vacuum, to yield the phosphoric acid ester of the formula (a) 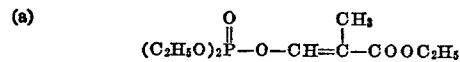

boiling at 118–121° C., under 0.08 mm. Hg pressure.

In an identical manner, the following phosphoric acid esters are obtained:

(B) 15 parts of α-formylchloroacetic acid ethyl ester in 20 parts by volume of chlorobenzene are heated to boiling point. During 5 minutes, 14 parts of trimethylphosphite are added drop by drop, and the reaction mixture is refluxed at boiling point for another hour. After this time, 4 parts of methylchloride have collected in a cooling trap above the reflux condenser. The solution is evaporated under vacuum at a bath temperature of 95° C. and gives as residue 22.2 parts of a mobile oil of the formula

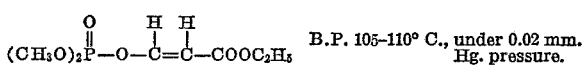   B.P. 105–110° C., under 0.02 mm. Hg. pressure.

EXAMPLE 2

8 grams of the phosphoric acid ester of Example 1 (Compound a) are mixed with 4 g. of Toximul Q (a mixture of a nonionic and an ionic emulsifier consisting of a condensation product of an alkylphenol with 10 to 20 mols of ethylene oxide and calcium dodecylbenzenesulphonate), and the whole is made up to 20 g. by adding xylene. In this manner an emulsion concentrate of 40% strength is obtained, which can be diluted with water in any desired proportion.

EXAMPLE 3

Activity against flies (*Musca domestica*)

Aqueous dilution (0.1%) of 20% emulsion concentrates from the compound of the Formula II and the compound of Example 1(a) is prepared, and it is observed when using Compound II that the activity drops after one week by 94%, and after 2 weeks by 99%, whereas when using the compound of Example 1, no drop in activity is observed after one week and after 2 weeks a drop of only 30%.

Example 4

When 62 to 125 g. per hectare of the compound of Example 1(a) are applied, it proves most effective against German cockroach, American cockroach, Russian cockroach, meal beetle, bacon beetle, blood worm, house cricket and the ant. In order to achieve an equivalent effect with Compound II, at least twice the amount thereof was needed, that is to say 250 g. of active substance per hectare, had to be used.

| | |
|---|---|
| (b) $(CH_3O)_2\overset{O}{\underset{\|}{P}}-O-CH=CH-CO-CH_3$ | B.P. (0.03 mm. Hg) 95°C. |
| (c) $(C_2H_5O)_2\overset{O}{\underset{\|}{P}}-O-CH=CH-CO-CH_3$ | B.P. (0.03 mm. Hg) 98° C. |
| (d) $(CH_3O)_2\overset{S}{\underset{\|}{P}}-O-CH=CH-CO-CH_3$ | B.P. 0.01 mm. Hg) 105° C. |
| (e) $(C_2H_5O)_2\overset{S}{\underset{\|}{P}}-O-CH=CH-CO-CH_3$ | B.P. (0.01 mm. Hg) 105–110° C. |
| (f) $(CH_3O)_2\overset{O}{\underset{\|}{P}}-O-CH=\overset{Cl}{\underset{\|}{C}}-COOC_2H_5$ | B.P. (0.09 mm. Hg) 110–112° C. |
| (g) $(C_2H_5O)_2-\overset{O}{\underset{\|}{P}}-O-CH=\overset{Cl}{\underset{\|}{C}}-COOC_2H_5$ | B.P. (0.13 mm. Hg) 120–123° C. |
| (h) $(CH_3O)_2-\overset{S}{\underset{\|}{P}}-O-CH=\overset{Cl}{\underset{\|}{C}}-COOC_2H_5$ | B.P. (0.05 mm. Hg) 117° C. |
| (i) $(C_2H_5O)_2-\overset{S}{\underset{\|}{P}}-O-CH=\overset{Cl}{\underset{\|}{C}}-COOC_2H_5$ | B.P. (0.04 mm. Hg) 117–118° C. |
| (j) $(C_2H_5O)_2\overset{S}{\underset{\|}{P}}-O-CH=\overset{CH_3}{\underset{\|}{C}}-COOC_2H_5$ | B.P. (0.05 mm. Hg) 120° C. |
| (k) $(CH_3O)_2\overset{S}{\underset{\|}{P}}-O-CH=\overset{CH_3}{\underset{\|}{C}}-COOC_2H_5$ | B.P. (0.08 mm. Hg) 115° C. |
| (l) $(CH_3O)_2\overset{O}{\underset{\|}{P}}-O-CH=\overset{CH_3}{\underset{\|}{C}}-COOCH_3$ | B.P. (0.3 mm. Hg) 108–110° C. |

What is claimed is:

1. A method for combatting harmful insects and acarids which comprises applying thereto an insecticidally and acaricidally effective amount of a compound of the formula

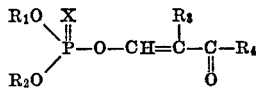

wherein $R_1$ and $R_2$ each represents lower alkyl, X represents a member selected from the group consisting of oxygen and sulfur, $R_3$ represents a member selected from the group consisting of hydrogen, chlorine and lower alkyl, and $R_4$ represents lower alkoxy.

2. The method according to claim 1 in which the compound is of the formula

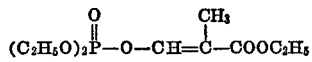

3. The method according to claim 1 in which the compound is of the formula

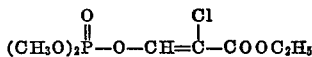

4. The method according to claim 1 in which the compound is of the formula

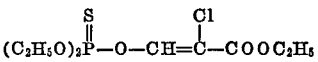

5. The method according to claim 1 in which the compound is of the formula

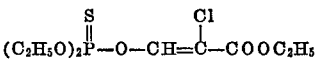

6. The method according to claim 1 in which the compound is of the formula

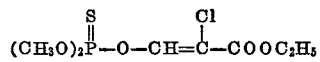

7. The method according to claim 1 in which the compound is of the formula

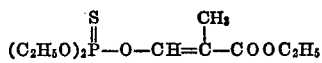

8. The method according to claim 1 in which the compound is of the formula

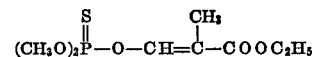

9. The method according to claim 1 in which the compound is of the formula

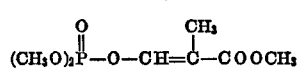

10. An insecticidal and acaricidal preparation comprising a carrier and an insecticidally and acaricidally effective amount of a compound of the formula

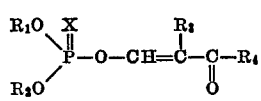

wherein $R_1$ and $R_2$ each represents lower alkyl, X represents a member selected from the group consisting of oxygen and sulfur, $R_3$ represents a member selected from the group consisting of hydrogen, chlorine and lower alkyl, and $R_4$ represents lower alkoxy.

References Cited
UNITED STATES PATENTS

| | | | |
|---|---|---|---|
| 3,014,839 | 12/1961 | Stiles et al. | 260—941 X |
| 3,081,220 | 3/1962 | Turner et al. | 260—941 X |
| 3,116,201 | 12/1963 | Whetstone et al. | 260—946 X |

STANLEY FRIEDMAN, Primary Examiner